INVENTOR.
JOHN E. KREINER

Jan. 19, 1965  J. E. KREINER  3,166,641
REMOTELY MONITORING CODE SIGNALING SYSTEM UTILIZING
A ROTATABLE CODED SURFACE WHICH ACTIVATES A
BISTABLE DEVICE AND SIGNALLING MECHANISM
Filed Feb. 5, 1962  9 Sheets-Sheet 4

INVENTOR.
JOHN E. KREINER

BY Eyre, Mann & Lucas

ATTORNEYS

INVENTOR.
JOHN E. KREINER

ATTORNEYS

INVENTOR.
JOHN E. KREINER

ATTORNEYS

Jan. 19, 1965   J. E. KREINER   3,166,641
REMOTELY MONITORING CODE SIGNALING SYSTEM UTILIZING
A ROTATABLE CODED SURFACE WHICH ACTIVATES A
BISTABLE DEVICE AND SIGNALLING MECHANISM
Filed Feb. 5, 1962   9 Sheets-Sheet 9
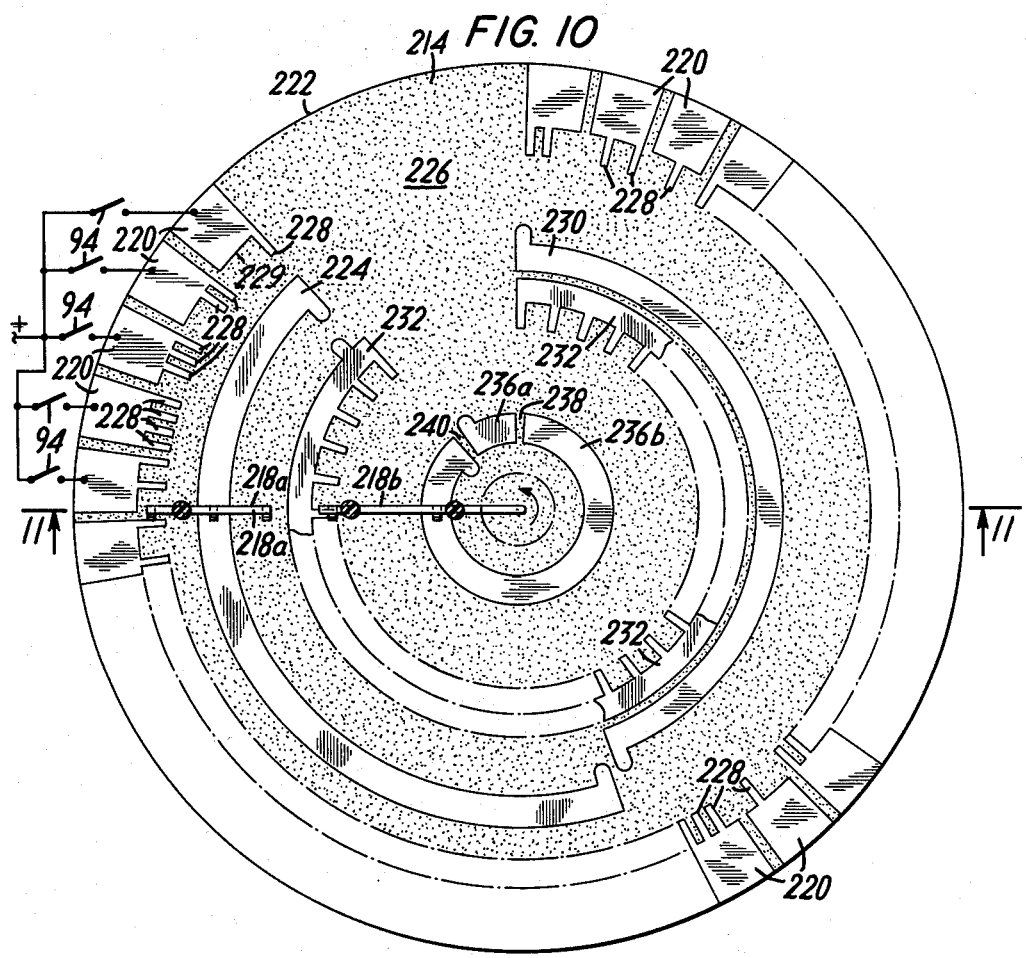
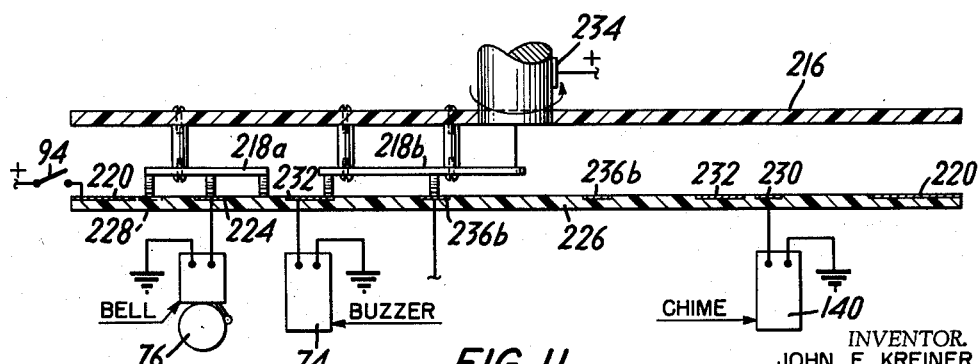
INVENTOR.
JOHN E. KREINER
BY Eyre, Mann & Lucas
ATTORNEYS United States Patent Office 3,166,641
Patented Jan. 19, 1965

3,166,641
REMOTELY MONITORING CODE SIGNALING SYSTEM UTILIZING A ROTATABLE CODED SURFACE WHICH ACTIVATES A BISTABLE DEVICE AND SIGNALLING MECHANISM
John E. Kreiner, Wilton, Conn., assignor to Edwards Company Inc., a corporation of Connecticut
Filed Feb. 5, 1962, Ser. No. 171,050
10 Claims. (Cl. 179—5)

This invention relates ot a code signal system for monitoring the operating condition of remotely located equipment. To accomplish code signaling, the present invention employs a rotating member which makes and breaks, in coded sequence, a number of circuits which contain a bistate device and a signaling means. The state of the bistate device indicates the operating condition of equipment which the device monitors, and the signaling means is capable of producing a signal over a suitable communication system. When each circuit is closed, the operation of the signaling means is dependent upon the state of the bistate device, so information concerning the operating condition of the monitored equipment may be transmitted to locations remote from the equipment in a coded sequence. The initiating, the carrying through, and ending, of the coding sequence is controlled by a notably simple switching circuit actuated by the reception of information from the communication system and the rotating member.

The rotating member is illustrated in the form of drums, discs and belts. The drum is shown as having a number of protrusions which contact the switches to open or close the circuits. The discs are shown as using a printed circuit with the bistate devices and signaling means connected thereto to form circuits which are made and broken by rotating contacts. The belts are made of a beaded chain with certain of the beads made larger by the addition of crimped on hoods. The beads with hoods actuate the switches which form the making and breaking members in the circuits.

All these methods provide for control of a large amount of circuits using conveniently sized devices. It should be understood, however, that while the illustrated devices are especially adapted for their intended purpose other techniques such as magnetic storage techniques, photo electric techniques, and indentations and holes, instead of protrusions may be used to effect the desired switching in conjunction with the teaching of applicant's invention.

In all the illustrated embodiments a telephone system is used to transmit the sound of the signaling means when a bistate device indicates a breakdown in the equipment. However, it should be understood that the present invention may be used with any suitable communication system which permits the transmission of signals in both directions between at least two points, and the switching of the bistate device may be arranged to transmit a signal when the equipment is in a satisfactory operating condition.

The illustrated embodiments of the invention using the rotating members allow the checking of the operating condition of a large amount of equipment without the use of complicated relay and step switching circuitry. They are simple and inexpensive to install and maintain, have a minimum of moving parts to provide positive and trouble-free signal coding, and are readily adaptable to change in coding or testing requirements. Further, as illustrated, if the capacity of the signal coding unit is insufficient, it may be readily expanded in a number of ways, by the teaching of applicant's invention, to monitor additional equipment without any substantial change in its basic structure. This ability for expansion prevents obsolescence of the unit if technological changes or expansion in the equipment require an increased number of tests. These and other advantages and the details of the structure of the present invention may be readily understood by reference to the drawings in which:

Figure 1:
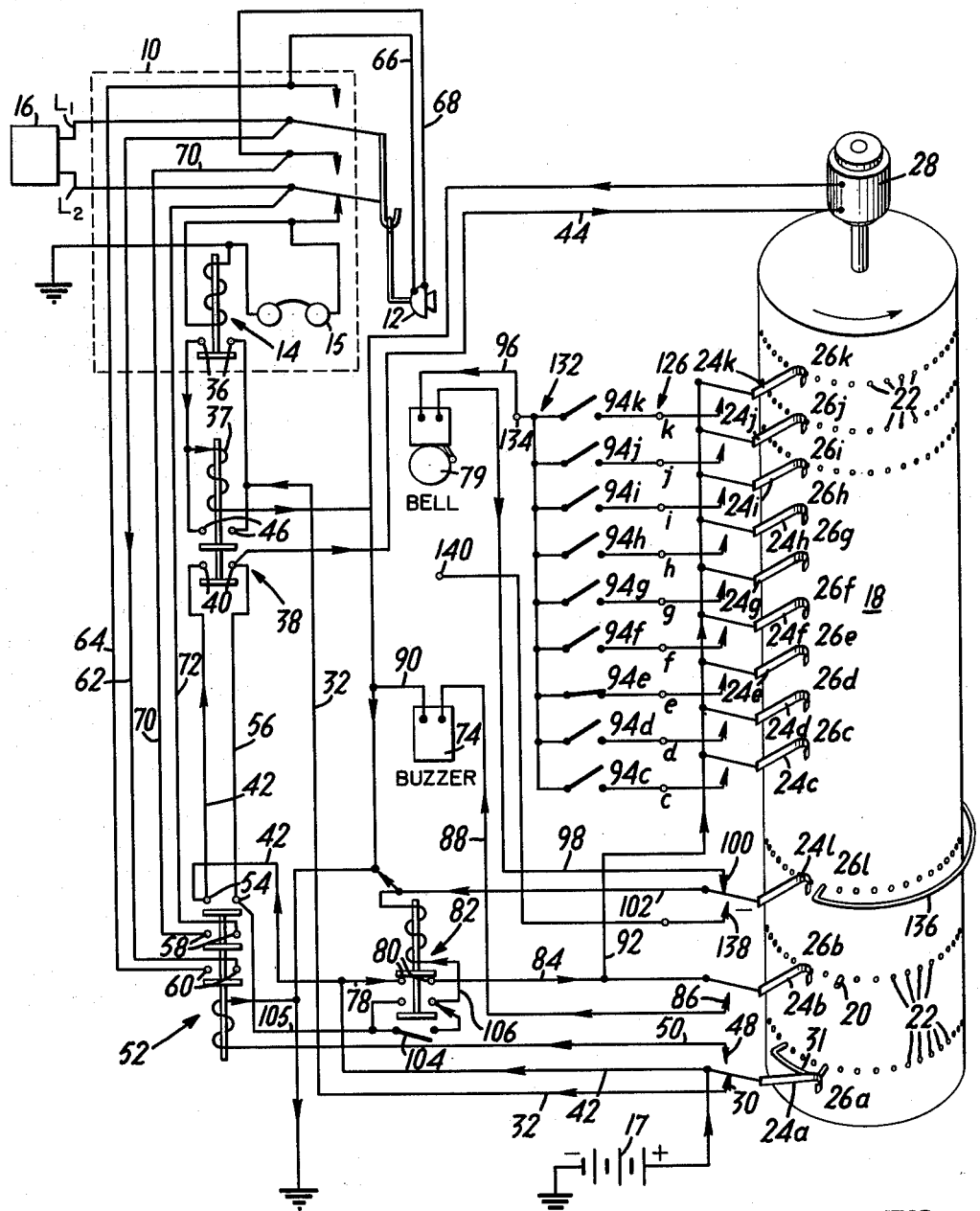
FIG. 1 is a schematic diagram of an embodiment of the invention with a code signaling drum.
Figure 5:
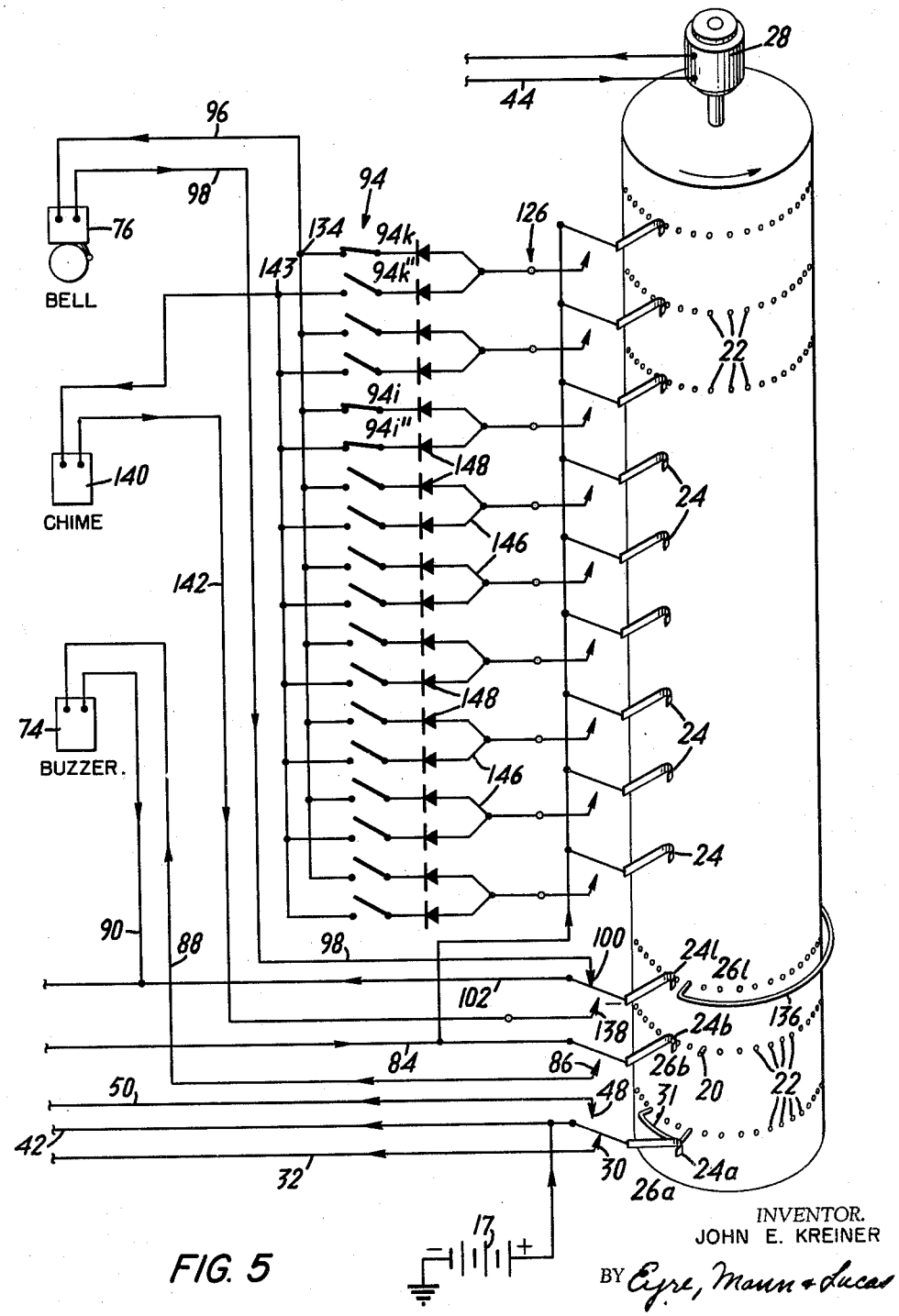

FIG. 5 schematically illustrates one way in which the member circuits in FIG. 1 may be expanded.

Figure 6:
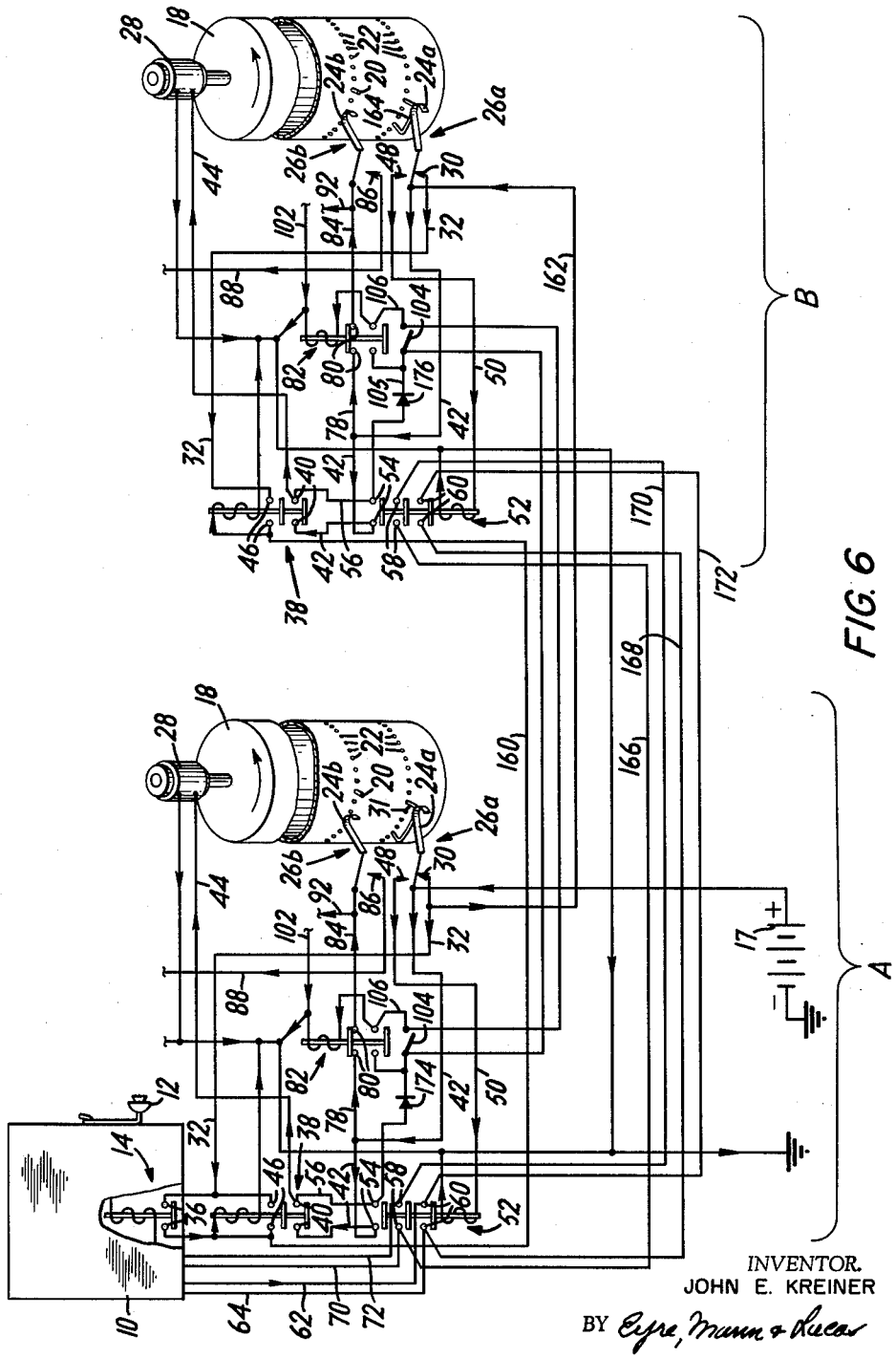

FIG. 6 illustrates another way in which the number of circuits of FIG. 1 may be expanded.

Figures 7, 8:
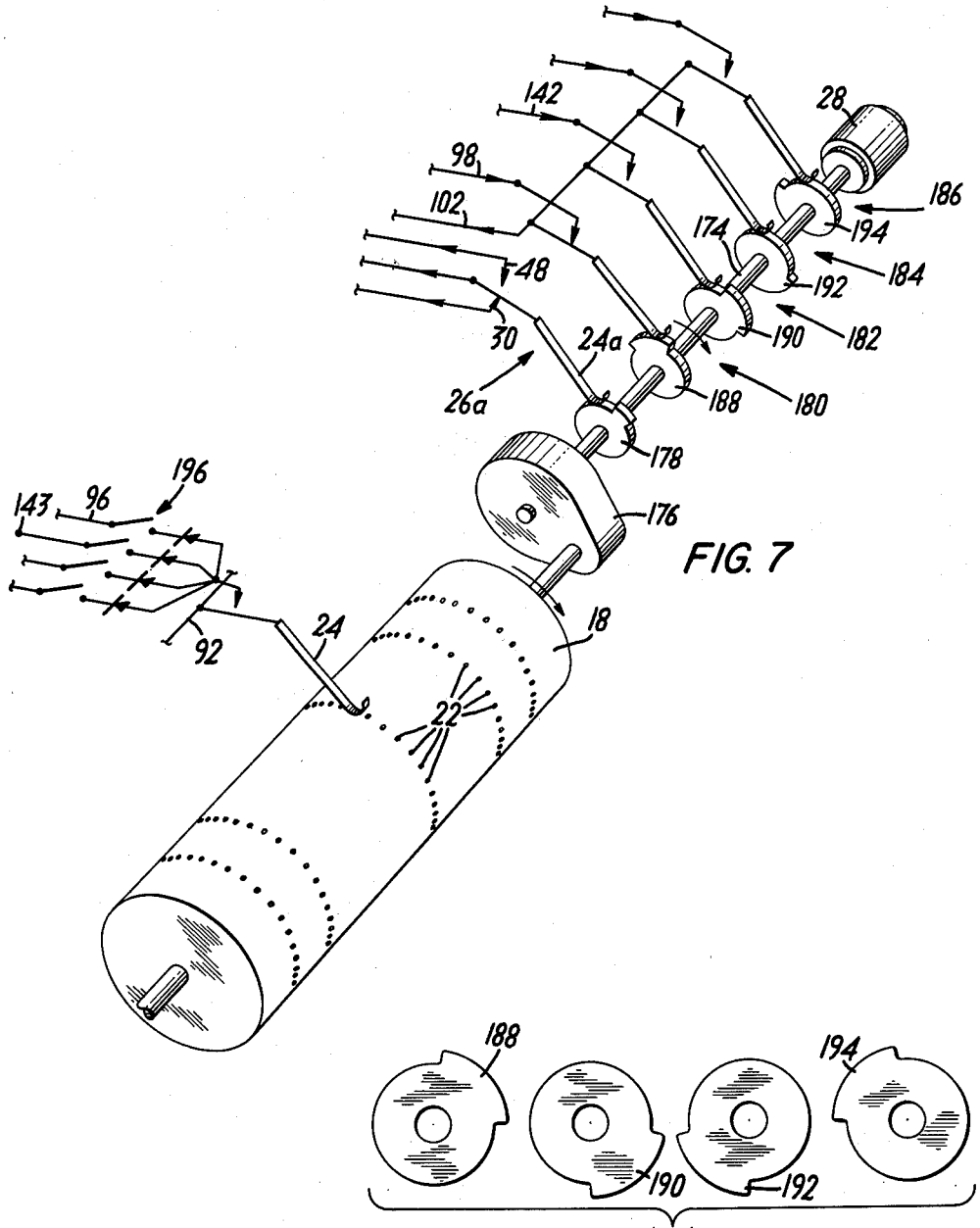

FIGS. 7 and 8 illustrate a third way in which the number of circuits of FIG. 1 may be expanded.

Figure 9:
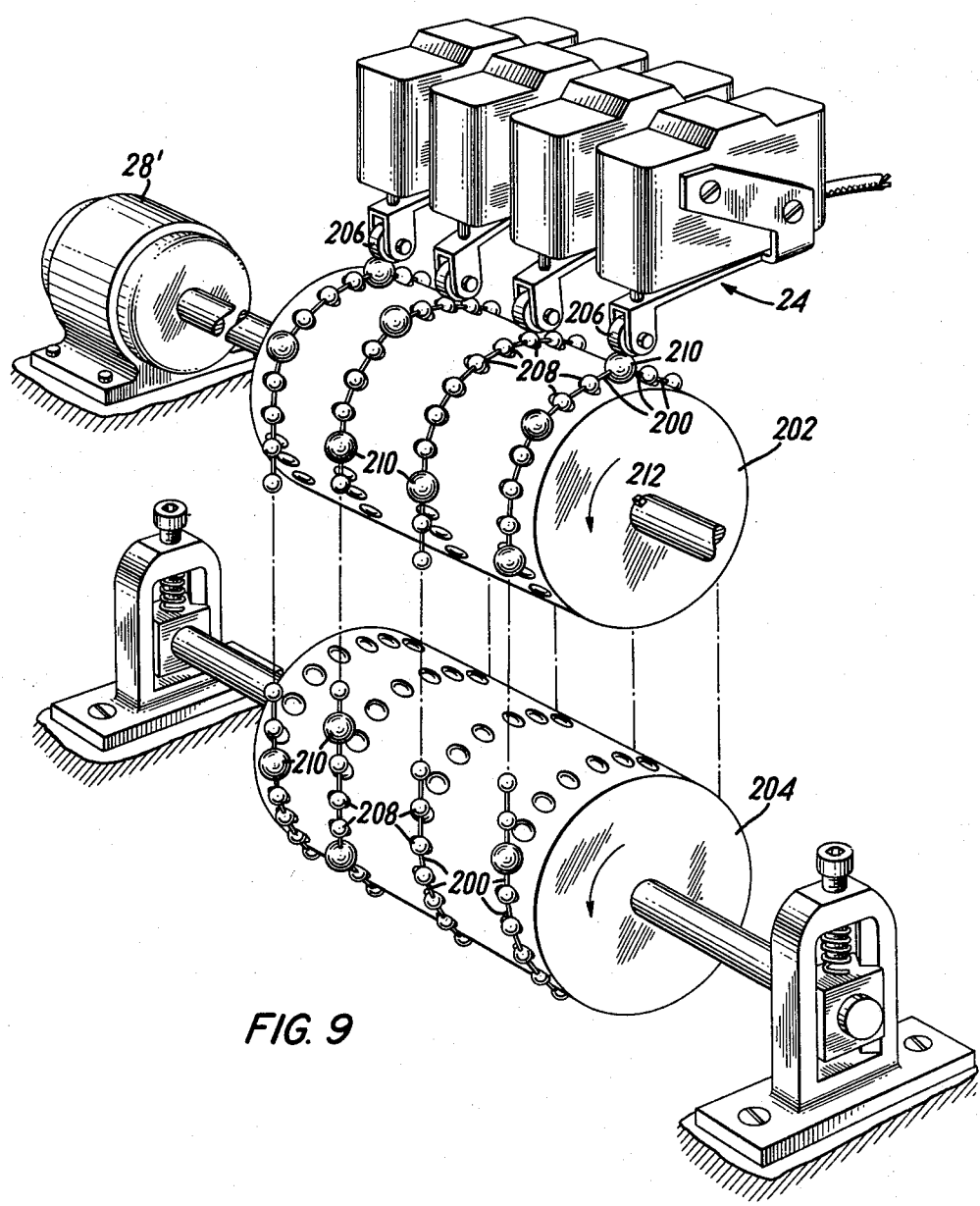

FIG. 9 illustrates beaded members which may be used in the illustrated systems in place of the drum of FIG. 1.

FIGS. 10 and 11 illustrate a commutating disc member which may be used in the illustrated systems in place of the drum of FIG. 1.

In the form of structure shown on FIG. 1, the basic nine circuit code unit is connected to a conventional telephone box 10 and the code signals are transmitted over the usual telephone 12. A conventional relay 14 installed by the telephone company is closed when the telephone bell 15 rings. The telephone at the substation is connected through the usual exchange (not shown) by the standard telephone power lines L1 and L2 to a telephone 16 located at the supervisory station.

Power for generating the code signals of the device of present invention is preferably supplied by a local power supply such as a conventional storage battery 17, and control of code signaling is achieved by means of rotating drum 18 provided with a plurality of pins 20 that fit into holes 22 and project out from the surface of the drum to actuate the spring switch arms 24 of a plurality of switches 26. The holes are positioned in twelve rows around the drum and each row of holes is positioned under a switch arm 24. In the preferred form of structure shown there are one hundred and twenty holes in each row around the drum and when a pin in a row contacts a switch arm 24 it lifts the arm up to open or close the contacts of the switch.

Drum 18 is mounted for rotation on the shaft of a conventional motor 28 and electric power for running the motor is controlled by the switch 26a. When the drum is in stationary position ready to start a coding cycle the switch arm of switch 26a is held in elevated position against the contact 30 by a cam such as bar 31. As a result electric current is supplied by line 32 to one of a pair of contacts 36 of the telephone relay 14 in box 10. When a calling party at the control station dials or otherwise rings the substation the telephone relay is closed and electric current flows across the contacts 36 and through the winding 37 of the motor starting relay 38. As a result the motor starting relay closes the pair of contacts 40 and current from battery 17 flows through line 42, across contacts 40, and through line 44 to motor 28 to start rotation of drum 18. The motor starting relay has a conventional lock in circuit 46 so that the relay remains closed even though electric current to bell 15 is interrupted as it is in normal ringing of the telephone. As long as cam bar 31 holds the switch arm 24a in elevated position closed against contact 30 motor 28 will continue to run and the telephone will ring in conventional manner.

It frequently happens that a supervisor at the central station may wish to communicate with personnel visiting the normally unattended substation and for this reason it may be desirable to have the telephone sound five to six audible signals to attract the attention of the visiting personnel. The time of telephone ringing may be increased or decreased by changing the length of cam bar 31.

When the desired number of audible signals have been given switch arm 24a drops off cam bar 31 to ride along the surface of the drum. As a result contact 30 is opened and contact 48 is closed. Electric current will now flow from contact 48 through line 50 to the winding of the normally open conventional relay 52 which is thereby closed. Relay 52 closes three sets of contacts.

The closing of contacts 54 feeds current from line 42 to line 56 which supplies current to motor 28 through line 44 so that the motor continues to run even though the motor starting relay 38 is open. The closing of the remaining two sets of contacts 58 and 60 connects telephone transmitter 12 to L1 and L2 so that code signals will be transmitted over the telephone lines without removing the telephone from the hook. Electric current from the regular telephone line L1 flows through line 62, across contacts 60 and back up line 64 to line 66. Line 66 feeds the current through the telephone transmitter 12, and lines 68 and 70 feed the current to the closed contacts 58. Current from the closed contacts 58 flows through line 72 which completes the circuit to L2. This energizes the telephone transmitter just as if the transmitter had been removed from the hook to complete the call. The telephone stops ringing and if a second call should later be placed while the transmitter is energized a busy signal will sound.

Code signaling over the telephone transmitter is preferably carried out by two different audible signals such as those generated by a buzzer 74 and a bell 76. In order to generate code signals current is fed from line 42 through line 78 across the normally closed contacts 80 of relay 82 and then through line 84 to the switch arm 24b of the switch 26b. Each time the switch arm is lifted up by a pin 20 in drum 18 it closes against contact 86 to supply current through line 88 to buzzer 74. The circuit is completed by line 90.

Current for operating bell 76 is fed by line 92 to each one of nine switches 26c through 26k. When the switch arm of each switch is lifted to close against the contact of the switch current is supplied to the corresponding field switch 94c through k. While the field switches are for convenience of illustration shown assembled in a group it will be understood that each of these switches are located in the field at specified equipment which is to be monitored. If the equipment such as a circuit breaker at an electric substation is operating in the normal required manner its switch 94 will be open. If the equipment is not functioning properly the switch as for example 94e for that particular piece of equipment will be closed to complete the circuit through line 96 to bell 76. When actuated current from the bell flows through line 98 to the contact 100 which is closed against switch arm 24L of switch 26L which rides along the surface of drum 18. The circuit through the bell is completed by line 102.

Figure 2:
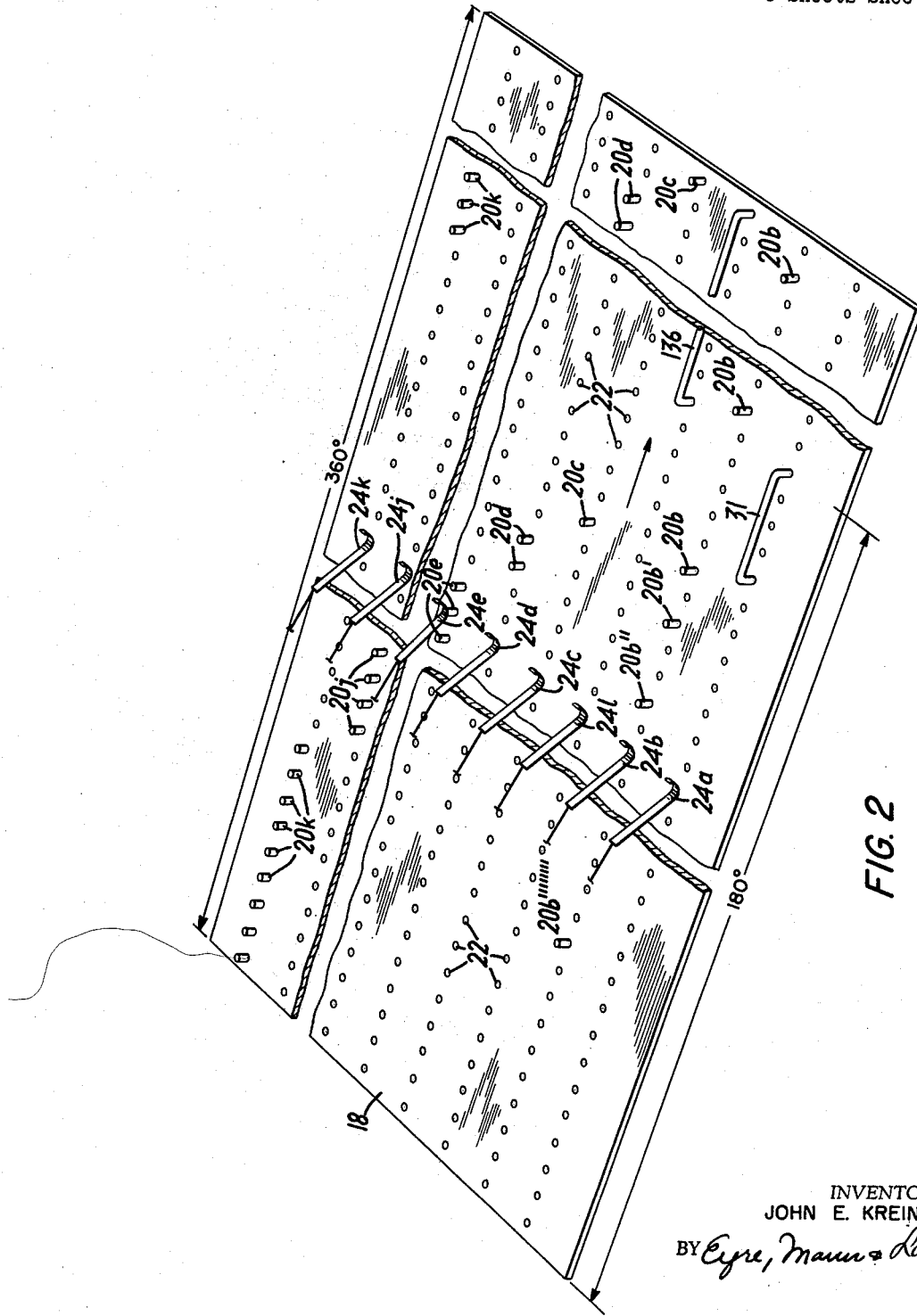
FIG. 2 shows the surface of a coded drum made planar to illustrate an arrangement of the pins in the surface of the drum for code signaling.

The one preferred arrangement of pins 20 for code signaling is illustrated in FIG. 2. As there shown, immediately after switch arm 24a drops down off the cam bar 31 to ride along the surface of the drum, switch arm 24b is lifted by the pin 20b which closes the circuit through the buzzer and the buzzing signal is transmitted by the telephone transmitter 12 over the telephone lines to the supervisor at the central station. This buzzing signal indicates that the code signaling of drum 18 has started. In this connection it will be noted that there are no pins along the length of the drum in the area of cam bar 31. Following the first buzz the pin 20c will contact the switch arm 24c to close the circuit to field switch 94c. Since the equipment monitored by switch 94c is operating in normal manner switch 94c is open and no bell tone will sound. Following this the pin 20b' will lift up switch arm 24b to give a second buzzing tone. Since no bell tone was sounded between the first and second buzz the supervisor at the central station knows that the equipment monitored by switch 94c is operating in normal manner. Thereafter, the two pins 20d will each contact and lift the switch arm 24d and since the switch 94d is open no bell tone will sound. Immediately thereafter, pin 20b' will contact the switch arm 24b and the buzzer will again sound. Since no bell tone sounded between the two buzzers the supervisor at the central station knows that the equipment of switch 94d is operating in normal manner. The same procedure is repeated for the nine switches 94c through k, and if all of the equipment monitored by the field switches is operating in normal manner no bell tone will sound and all the supervisor hears is the audible signal of the buzzer.

However, if we now assume that the equipment monitored by the field switch 94e is inoperative or operating in abnormal manner the switch 94e will be closed as illustrated in FIG. 1. In this case the supervisor hears the buzz of pin 20b' and immediately thereafter the three pins 20e will actuate the switch arm 24e and three single bell tones would be transmitted to the supervisor followed by the buzz of pin 20b''' (not shown). The supervisor then knows that trouble conditions exist and since three bell tones were sounded the supervisor automatically knows that the trouble is in the equipment monitored by switch 94e. It will now be understood that the telephone code signaling unit not only indicates the presence of trouble conditions at the substation, but it also designates the exact location of the trouble.

After all of the nine field switches have been checked the drum continues to rotate until the switch arm 24a again rides up on the cam bar 31. When this occurs switch arm 24a is closed against contact 30 which interrupts the flow of current through line 50 to deenergize the relay 52 which thereby opens the contacts 54, 58 and 60. The opening of contacts 54 interrupts the supply of current to motor 28 to stop rotation of drum 18. The opening of contacts 58 and 60 deenergizes the telephone transmitter and the code signaling unit is now again ready to repeat the cycle which will be done when a call is placed to the telephone at the substation as described hereinabove.

If a supervisor at the central station has called the substation in order to talk with visiting personnel at the unattended substation the telephone bell will ring to attract the attention of visiting personnel while switch arm 24a rides cam bar 31. If code signaling should start while a repairman is answering the telephone he will close momentary push button switch 104. As a result, current from the closed contacts 54 flows through line 105 to energize the coil of relay 82 which opens contacts 80 to interrupt the flow of current to the switch 26b and switches 26c through 26 k. This silences buzzer 74 and bell 76 so that the repairman may talk to the supervisor at the central station without being disturbed by the audible code signals. The relay 82 has a conventional lock in circuit 106 which seals in the relay until drum 18 has completed a single revolution. At such time the switch arm 24a rides up on the cam bar 31 so that current to relay 52 is interrupted to open this relay and interrupt the flow of current to relay 82 to deenergize the relay and again close the contacts 80 for subsequent operation.

Control of the code signaling unit by means of the rotating drum 18 is an important feature of the present invention. In operation the drum and pins provided extremely positive and reliable code signaling with only a very few moving parts of simple and inexpensive construction. The drum has a large capacity for controlling switches which makes the unit quite compact so that it may readily be mounted in a box 108 (FIGS. 3 and 4) which is only about twenty-two inches long, sixteen inches wide and seven inches deep. The preferred form of drum 18 shown in the drawings and the construction and arrangement of the parts in box 108 is of great practical advantage since the basic nine circuit code unit may be readily expanded into an eighteen circuit code unit without any major change in the basic structure.

Figure 3:
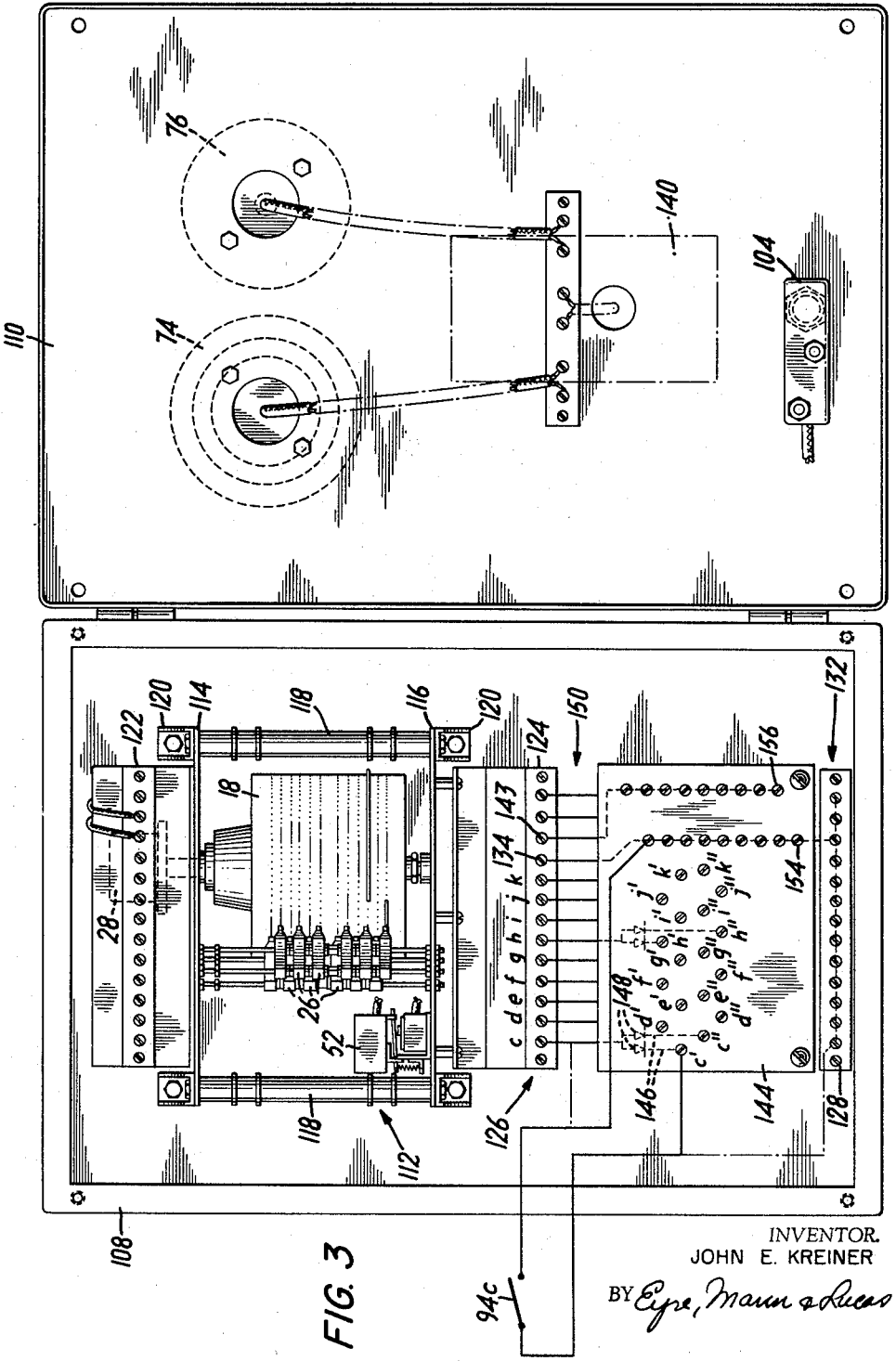
FIG. 3 is the front view of a box in which a code signaling unit is mounted with the door of the box open to show the interior.
Figure 4:
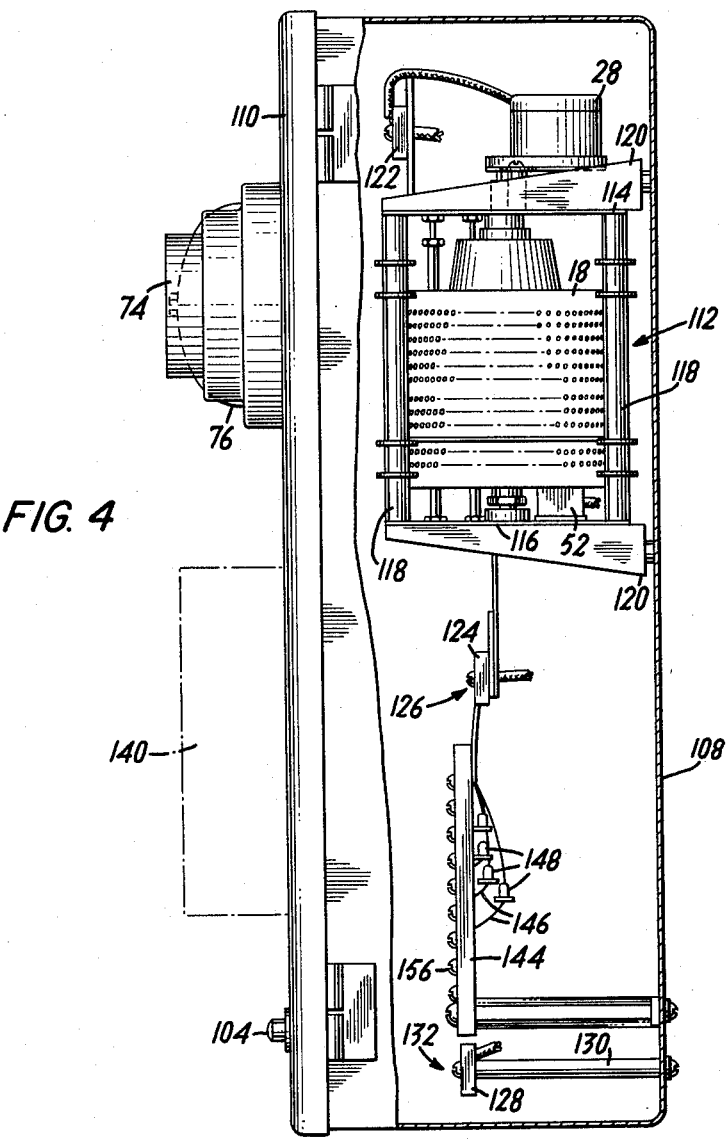
FIG. 4 is a side view of the box of FIG. 3 with the door closed.

Box 108 in which the unit is mounted as shown in FIG. 3 has a hinged door 110 on which is mounted the bell and buzzer and the switch 104 for silencing the audible signals. The hinged door 110 remains closed during normal operation to protect the working parts which are arranged within the box as shown in FIGS. 3 and 4. As there shown, a suitable framework 112 comprising a top plate 114 and a bottom plate 116 separated by suitable standards 118 is bolted to the wall of the box as at 120 and drum 18, motor 2, switches 26 and the relays are all mounted on framework 112 to consolidate these working parts into a single assembly. Electric wiring for these parts to complete the circuit as illustrated in FIG. 1 may be arranged in any convenient manner in the box and for this purpose suitable terminal boards 122 and 124 are mounted at the top and bottom of framework 112 to provide the necessary terminal connectors. When this is done the entire code signaling assembly with electric circuit may be readily installed or removed from the box.

In the preferred form of structure shown the bottom terminal board 124 is provided with nine terminal connectors marked with the letters c through k and each one of these terminals is connected to one of the switches 26c through k as indicated at 126 in FIG. 1. A third terminal board 128 is mounted on suitable standards 130 in box 108 and this board carries the nine common terminal connectors indicated at 132 in FIG. 1 which are wired in series and connected to a terminal 134 (FIGS. 1 and 3) in the electric circuit of bell 76. This arrangement of readily available terminal connectors in box 108 for each side of the field switches 94c through 94k makes it possible for the user to readily connect the code signaling unit to the desired field switches at the substation without disturbing the basic circuitry of the code signaling unit.

Another great advantage of the preferred form of structure is that it may readily be expanded into an eighteen circuit code unit without disturbing the wiring of the basic nine circuit code unit. As described hereinabove drum 18 is provided with twelve parallel rows of holes around the drum and each row has one hundred and twenty holes. As shown in the drawings the holes in each of the rows are aligned along the length of the drum. The code signaling sequence for the nine field switches 94c through k only requires fifty-five different longitudinal lines of holes for the entire sequence which is five lines less than one half the distance around the surface of the drum. As a result the second half of the preferred form of drum may be employed for doubling the capacity of the basic nine circuit code unit into an eighteen circuit code unit.

A pin 20 (not shown) is positioned in the fifty-fifth hole of the row under switch arm 24b to mark the end of code signaling for the nine field switches 94c through 94k. One end of a cam bar 136 (FIG. 5) is positioned in the fifty-sixth hole of the row under switch arm 24L and cam bar 136 is extended around the surface of drum 18 for a distance of at least fifty-five holes to terminate at one end of cam bar 31. At the end of code signaling for field switches 94c through 94k, cam bar 136 will lift switch arm 24L to open the circuit through contact 100 and close the circuit through contact 138. When this occurs drum 18 continues to rotate but no code signaling will take place since the pins for the nine code unit are ordinarily positioned in the first fifty-five longitudinal lines of holes.

In an eighteen circuit code unit a second series of pins 20 are inserted in the fifty-five longitudinal lines of holes positioned in the area occupied by cam bar 136. The second set of pins are preferably arranged in the holes in identical manner to that employed for the buzzer and bell of the basic nine circuit code unit.

The second series of pins may be inserted without removing the unit from the box by merely uncoupling the motor from the drum shaft so that the drum may be rotated at will. A third audible signal such as a chime 140 (FIGS. 4 and 5) is mounted on the cover of box 108 and wired into the circuit of the eighteen circuit unit as shown in FIG. 5. One side of the chime box is connected to switch arm 24L by means of a line 142 and the second side of the chime box is connected to a terminal 143 on the terminal board 124 (FIGS. 3 and 5).

A special prefabricated terminal board 144 is provided which when added to the assembly in box 108 will take the place of terminal board 128 and will complete the conversion from a nine circuit code to an eighteen circuit code unit. The prefabricated terminal board 144 has nine terminal connectors c' through k' and nine additional terminal connectors c'' through k''. Each of the eighteen terminals have an individual lead 146 provided with a diode 148 and the eighteen terminals are coupled together in pairs to provide a total of nine leads as indicated at 150. The nine common terminals for the bell circuit (132 of terminal board 128) are mounted on terminal board 144 and wired together as indicated at 154 of FIG. 3 and the nine common terminals for the chime are also mounted on terminal board 144 and wired together as indicated at 156.

The conversion from the nine circuit code unit of FIG. 1 to the eighteen circuit code unit of FIG. 5 is completed by connecting each of the common leads 150 for the single and double prime terminals of board 144 to the nine terminals c through k of terminal board 124 and by connecting eighteen field switches to the terminal connectors of board 144. For example one lead of the nine field switches 94c through k is connected to the terminal connectors c' through k' and the second lead is connected to one of the nine common terminal connectors 154. The circuit through the bell is completed by connecting the nine common terminals 154 to terminal 134 on board 124. When connected in this way the code signal sequence for the field switches 94c through k will be the same in the eighteen circuit code unit as it was in the nine circuit code unit. In similar manner, one lead of each of the nine additional field switches (not shown) is connected to the nine terminal connectors c'' through k'' and the second lead is connected to the common terminals 156 for chime 140. The common terminals 156 are all connected to terminal 143 which is in the chime circuit and positioned on terminal board 124 so that the nine circuit code unit may be expanded into an eighteen circuit code unit without disturbing the basic wiring of the operating assembly.

When terminal board 144 is employed there is no need for the terminal board 128 since all of its connections are made on terminal board 144. Since the arrangement of pins in drum 18 for the chime is identical to that employed for the bell, code signaling for the additional nine field switches will be the same as the code signals for the nine field switches 94 except that a chime will sound in place of a bell tone. By positioning a pin 20 (not shown) in the fifty-fifth hole of the row under switch arm 24b a buzzing signal will sound to mark the end of the bell code signaling and the start of chime code signaling for the nine additional field switches.

Referring again to FIG. 5 it will be seen that the diodes in each of the bell and chime circuits are important to prevent false signaling because of so-called sneak circuits. For example if field switch 94k were closed and field switch 94i were closed and field switch 94i'' (FIG. 5) which is connected to terminal i'' was also closed (FIG. 3) a false signal would be given if there were no diodes. In such case when switch arm 24k is lifted by the nine pins in its row of holes during the chime signaling cycle current would flow across the field switch 94k in the bell circuit and then back across the closed contacts of the field switch 94i in the bell circuit and then across the closed field switch 94i'' in the chime circuit to sound nine separate chime tones falsely indicating trouble at the field switch 94k'' which in fact is operating in normal trouble free manner. The diodes 148 prevent any such false signals.

Another advantage of the telephone code signaling device of the present invention is that additional code signaling units may be readily added to the basic unit for monitoring additional equipment without any major change in the structure or operation of the basic units. FIG. 6 illustrates the combination of two of the basic code units of FIG. 1 into a thirty-six circuit code unit.

Both of the basic units A and B are actuated by placing a call to the telephone of box 10 and both units in succession transmit code signals over the same telephone transmitter 12. For this purpose the two boxes (not shown) in which the units are assembled as described hereinabove are arranged near the telephone transmitter so that the audible signals of both units will be transmitted. In the following description of the operation of the two units of FIG. 6 the reference characters of FIG. 1 and 5 are employed to designate parts identical to those in the device of FIGS. 1 and 5.

When a supervisor at the central station calls the telephone box 10, the drum 18 of code signaling unit A will rotate through a single revolution to transmit its eighteen code signals exactly as described for the device of FIGS. 1 and 5. As soon as the motor starting relay 38 of unit A is closed to start motor 28, electric current supplied by battery 17 to the motor starting relay of unit A is also fed to the motor starting relay 38 of unit B by line 160 to close the motor starting relay of unit B and start its motor 28.

Electric current for operating unit B is fed to switch arm 24a by line 162. When the drum of unit B is in stationary position, cam 164 holds switch arm 24a closed against its contact 30 and as a result current is fed through line 32 to the lock in contacts 46 to hold the motor starting relay closed as long as the switch arm remains on cam 164. During this time electric current for operating motor 28 of unit B flows through line 42, across contacts 40 and through line 44 to motor 28 to start rotation of drum 18. Examination of FIG. 6 shows that both of the motors in units A and B will continue to run as long as switch arm 24a of unit A remains on cam bar 31 and switch arm 24a of unit B remains on cam bar 164.

In order to coordinate successive code signaling of the two units cam bar 164 is made at least one hole space shorter than cam bar 31. As a result switch arm 24a of unit B will drop off cam bar 164 to open contact 30 and close contact 48 while the switch arm of unit A is still on cam bar 31. When this occurs current supplied to unit B will flow from switch arm 24a through line 50 to close the normally open relay 52. As a result the two sets of contacts 58 and 60 of relay 52 in unit B will be closed and since these two sets of contacts are connected in multiple with the corresponding contacts in unit A by lines 166, 168, 170 and 172 respectively, the closing of contacts 58 and 60 in unit B will actuate the telephone transmitter 12 for code signaling. Since the cam bar 31 is only one hole space longer than cam bar 164 the switch arm 24a of unit A will drop off the cam bar immediately after the telephone transmitter has been actuated. When switch arm 24a drops off cam bar 31 in unit A the supply of current to unit B is cut off because contact 30 in unit B is opened. As a result the motor in unit B stops and drum 18 in unit B ceases to rotate while unit A transmits its code signals for the eighteen field switches (not shown) as described hereinabove for the device of FIG. 5.

At the end of the code cycle switch arm 24a in unit A will again ride up on cam 31 to stop rotation of the drum and current will again be supplied to switch arm 24a of unit B through line 162. Since contact 148 is closed in unit B current flows through line 50 to relay 52 which is thereby closed to start the motor and rotation of drum 18 in unit B. The drum of unit B will rotate until it completes a revolution to transmit its code signals for the eighteen field switches (not shown) connected to unit B. At the end of the cycle, switch arm 24a will ride up cam 164 to stop rotation of drum 18 in unit B which completes the code cycle for both units.

In the preferred form of structure shown in FIG. 6 the terminals of silencing switch 104 unit A are connected to the terminals of silencing switch 104 in unit B. As a result audible signaling of both units A and B may be silenced and the telephone answered by repairman visiting the substation. Since the switch 104 of unit A is connected in multiple with switch 104 of unit B either one of the switches may be momentarily closed to silence code signaling. In this way audible signaling of unit B will be silenced even if unit A has started code signaling and unit B is ready to start code signaling. The diode 174 in line 105 of unit A and the diode 176 in line 105 of unit B prevent current from a closed silencing switch in one unit from flowing from line 105 through line 56 in the second unit to start the motor which would otherwise be stationary. As described hereinabove two of the code signaling units of FIG. 5 may be readily combined to provide a thirty-six circuit code signaling unit by merely adding two diodes and the described lines for operating the second unit. In the preferred form of structure a conventional horn (not shown) is substituted for buzzer 74 in order to identify and distinguish the code signaling of unit B from that of the buzzer of unit A. The code signaling switches, field switches, and audible signals are not shown in FIG. 6 for convenience of illustration. These elements although not shown are of course present in both of the units A and B of FIG. 6.

Additional code signaling units may be readily added to the structure shown in FIG. 6 by merely connecting the additional units in the manner described for the structure of FIG. 6. In such case current for operating the third unit would be supplied from line 32 of unit B and the cam bar in the third unit would be made slightly shorter than the cam bar in unit B in order to provide successive code signaling of the multiple assembly of units.

FIG. 7 illustrates a second way in which basic code signaling device of FIG. 5 may be modified to expand the eighteen circuit code unit into a thirty-six code unit. In such case the shaft 174 of motor 28 drives the shaft of drum 18 through a conventional gear box 176 so that drum 18 will make two complete revolutions for each single revolution of shaft 174. The switch 26a for controlling operation of motor 28 is mounted adjacent shaft 174 and the contacts 30 and 48 of switch 26a are opened and closed by a cam 178 mounted on the surface of shaft 174 to provide a single revolution of shaft 174 each time a call is placed to the telephone at the substation. As a result drum 18 will complete two complete revolutions before it stops. Switch 26L in the device of FIG. 5 is replaced by four switches 180, 182, 184 and 186 respectively which are connected in multiple to line 102 which supplied current to the switches. The normally open contacts of the switches are each connected to a different type of audible signaling device. For example the contact of switch 180 is connected to line 98 to complete the circuit through the bell. Switch 182 is connected by line 142 to a chime and in like manner the other switches may be connected to means for generating different audible signals such as a horn and the like. Each of the switches are separately operated by a suitable cam positioned on shaft 174 and as illustrated in FIG. 8 the cams are arranged to provide a different audible code signal for each ninety degrees of turn of shaft 174 which corresponds to one hundred and eighty degrees of turn of drum 18.

Drum 18 rotates so that when switch arm 24a drops off its cam bar 178 cam 188 will lift the switch arm of switch 180 to close the contact and to transmit the bell code signals for one half a revolution of drum 18. At the end of the first half revolution the switch arm of switch 180 will drop off its cam and the switch arm of switch 182 will be lifted by its cam 190 to close the contact and to transmit chime code signals for the second half of the revolution of drum 18. In like manner the switch arms of switches 184 and 186 are lifted by cams 192 and 194 to transmit different code signals for each half of the second revolution of drum 18. Since there are four field switches 196 connected to each of the switches 26c through k and since the pins are arranged in drum 18 in the manner described for the drum of FIG. 5 the device shown in FIG. 7 will monitor thirty-six field switches during a single revolution of shaft 174 and the audible code signals will designate the exact location of trouble should it exist in the equipment at the substation. It is only deemed necessary to show a portion of the code signaling device of FIG. 7 as the remaining parts of the assembly are of identical construction to that of the device in FIG. 5.

In all of the embodiments previously described the code member has been a drum, however, belts and discs may also be used for switching purposes. For instance, FIG. 9 illustrates a beaded belt 200 rotatably mounted on a driven sprocket 202 and, to provide tension, an idler sprocket 204, or alternately, the belt 200 may be used without an idler sprocket 204 so it hangs freely on the driven sprocket 202. A switch indicated as 24 in FIG. 1 is mounted so its roller 206 rolls across the individual beads 208 in the chain without its switching the switch. However, hoods 210 may be crimped over individual beads in the chain to make that bead larger in diameter. This larger diameter bead will press the roller 206 against the switch 24 to switch it. A number of these devices may now be substituted back into the system of FIG. 1 where a chain is substituted for each row of holes 22 in the drum so the beads 208 in the chain are analogous to the holes 22, the beads with crimped on hoods 210 are analogous to the holes with a pin 20 stuck therein and the shaft of the motor 28 in FIG. 1 is connected to the driven sprockets 202 by key 212. By hoods crimped over beads in accordance with the desired code, operation as in the system of FIG. 1 can be accomplished.

To accomplish the desired results with discs a stationary disc is used in conjunction with a number of rotating contacts. The disc is made nonconducting with conducting areas etched thereon. An example of this is found in FIGS. 10 and 11 where there is shown an insulated disc 214 having conducting areas (indicated in light on the drawings) etched on its insulated surface (stippled in the drawings). A shaft to be driven by the motor 28 of FIG. 1 is connected to a rotating disc 216 with a series of contacts 218 connecting and disconnecting certain of the conducting areas to each other as the disc 216 rotates.

The etched disc 214 has a series of conducting areas 220 along its periphery 222. Each of these areas is connected to a field switch, numbered 94 as in FIG. 1. An inner ring 224, separated from the mentioned peripheral areas 220 by the nonconducting surface 226 is connected to a bell, numbered 76 as in FIG. 1. A brush 218a connects this bell slip ring 224 with conducting strips 228 along the inner edge 229 of the peripherally located conducting areas 220. These conducting strips 228 are arranged in a coded sequence and are therefore analogous to the pins 20 of the drum. As the brush passes over them it completes a circuit between the field switches 94 and the bell 74. Then as in the system of FIG. 1, if the field switch indicates an inoperative condition of equipment the bell will ring.

As in the case of the system shown in FIG. 1 this disc may be used in conjunction with a second sound such as a chime, numbered 140 as in FIG. 1, by having the slip ring 224 for the bell 76 cover only part of the distance around the disc 214 and providing another slip ring 230 for the chime 140 over another part of the distance. The slip rings for the chime 140 and bell 76 are located at different points along the radius of the disc so that the double brush 218a will contact only one of the slip rings at a given time.

A separating signal may be supplied by the addition of another ring 232 connected to the buzzer, numbered 74 as in FIG. 1. A brush 218b intermittently connects the buzzer ring 232 to a power source slidably connected by a brush 234 on the shaft of the motor 28 so as to provide a buzzing sound prior to the commutation of each of the peripheral areas 220.

To control the ringing of the telephone an internally located connecting ring 236 split into two sections 236a and b is used. The first section 236a performs the function of cam bar 31, in FIG. 1, and supplies voltage which provides excitation to the motor during the ringing of the telephone. When the brush passes on to the second section 236b voltage is supplied to relay 52 which opens the telephone circuits, stops the ringing, and at the same time, continues to supply excitation to the motor 28. The slits in 238 and 240 in the inner ring are narrow enough for the brush 218b to bridge them during the commutating action and thus assure a continuous supply of excitation to the motor 28 throughout the coded sequence.

It will be appreciated by those skilled in the art that the field switches monitored by the code signaling device of the present invention may be a conventional type of switch customarily employed for checking liquid levels, blower operation, steam generators, lubrication, the opening or closing of circuit breakers or any other type of equipment located at the remote substation. If desired, annunciators adapted to give an audible and visible signal may be suitably wired to the field switches to give primary trouble signals at a substation where operating personnel are present and the telephone code signaling in such case would be employed for providing a secondary trouble signal to the supervisor at the central station. Alternatively, the code signaling units may be wired in conventional manner into a lamp annunciator unit. If desired a conventional automatic dialing instrument can be located at the substation for calling the central station when trouble condition exists. In such case, the automatic dialing instrument would be connected to each of the field switches so that the central station would be dialed when any one field switch closes. Alternatively, the automatic dialing operation may be carried out by using a separate drum or by arranging a special row of pins in drum 18 positioned in proper dialing sequence to provide the usual electric impulses over the telephone company lines. In such cases, rotation of drum 18 would be actuated by the closing of a field switch to indicate trouble conditions. Other modifications of the preferred form of structure will be obvious to those skilled in the art.

It will be understood that A.C. current may be employed for operating the telephone code signaling system but D.C. battery current is preferred to provide code signaling when the usual power lines are inoperative. Private telephone lines may be employed in place of the regular telephone company lines.

It will also be understood that it is intended to cover all changes and modifications of the preferred form of structures chosen for the purpose of illustration which do not constitute a departure from the spirit and scope of the invention.

What is claimed is:

1. A system for monitoring the operating condition of equipment at one location from another location comprising
   (a) a communication system capable of transmitting signals between the monitoring location and the location of the equipment,
   (b) a signal producing means for producing signals capable of transmission from the location of the equipment to the monitoring location over the communication system,
   (c) a plurality of bistate devices which by their state indicate the operating condition of the equipment to be monitored,
   (d) a plurality of switching means which switch circuits by their switching action,
   (e) a plurality of circuits each containing said signal producing means and at least one each of said bistate means and said switching means so that transmission of signals over the communication system is dependent on the operating condition of the equipment and the switching action of said switching means,
   (f) a rotatable member means with a coded surface which as the rotatable member means rotates causes said switching means to switch said circuits in coded sequence so signal transmission over the communications system will be a function of the operating condition of the equipment and the coded sequence,
   (g) motor means coupled to said rotatable member means to rotate said rotatable member means and thereby cause said coded surface to switch said switching means in coded sequence and
   (h) means responsive to signals received over said communication system at the equipment location to activate said motor means so it rotates said rotating member to switch said switching means in said coded sequence.

2. The structure of claim 1 wherein said motor means continuously rotates said rotating member through a whole coded sequence once said means responsive to signals received over said communication system activates said motor.

3. The structure as specified in claim 1 wherein:
   (a) said communication system includes a telephone in the vicinity of the equipment and means connecting the telephone to the monitoring location; and
   (b) said signal producing means provides an audible signal to be picked up by said telephone.

4. The structure as specified in claim 1 including a second signal producing means responsive to the orientation of said rotatable member means for providing a signal each time one of said switching means is actuated to transmit a coded signal.

5. The structure as specified in claim 1 including:
   (a) an alternate signal producing means;
   (b) a second plurality of circuits each including said alternate signal producing means, a bistate device and a switching means which is in one of the first mentioned plurality of circuits;
   (c) means responsive to the orientation of said rotatable member means which alternately activates said first and second circuits; and
   (d) diodes in each of said first and second plurality of circuits.

6. The structure as specified in claim 1 including:
   (a) a first set of terminals connected to said plurality of switching means;
   (b) a second set of terminals connected to said plurality of bistate devices;
   (c) circuit means connecting two terminals in said second set with one of the terminals in said first set, said circuit means including diodes between each of the two terminals in the first set and the terminal in the second set; and
   (d) circuit means for connecting one of the two mentioned terminals in the second set with said signal producing means and for connecting the other of the two mentioned terminals in the second set with an alternate signaling means.

7. The structure as specified in claim 1 in which removable pins are positioned on the rotatable member means and project from the surface thereof to physically contact the switching means in the plurality of switching means to thereby switch said switching means in coded sequence.

8. A code signaling apparatus to be used in conjunction with a telephone system having a telephone monitoring a number of field switches, whose position indicates the operating condition of equipment, said code signaling apparatus comprising
   (a) signal producing means to produce signals over said telephone when said telephone is transmitting,
   (b) a plurality of switching means which switch circuits by their switching action,
   (c) a plurality of circuits each containing said signal producing means and at least one of said field switches and switching means connected in series so that transmission of signals over the telephone is dependant on the position of said field switches and the switching action of said switching means,
   (d) coded rotary member means which as it rotates switches said switching means in coded sequence by variations in the characteristics of a surface of said rotary members so signal transmission over the telephone will be a function of the operating condition of the equipment and the coded sequence,
   (e) motor means coupled to said coded rotary member means to provide motive power to rotate said rotary member means so that it switches said switching means in coded sequence,
   (f) and circuit means responsive to signals transmitted to said telephone to activate said motor means so it rotates said rotating member to switch said switching means in coded sequence and to activate said telephone to transmit the signals produced by said signaling means.

9. A code signalling system which comprises
   (a) a calling station,
   (b) an equipment station,
   (c) means for transmitting audible signals from said equipment station to the calling station,
   (d) a plurality of code switches at said equipment station,
   (e) a drum adapted to rotate and open and close said plurality of code switches,
   (f) motor means for rotating the drum,
   (g) audible signaling means,
   (h) a plurality of field switches for monitoring the operation of equipment at the equipment station,
   (i) one side of each of said field switches being connected to said audible signaling means for transmitting electric current thereto when trouble conditions exist,
   (j) the second side of each of said field switches being connected to one side of a code switch,
   (k) electric circuit means for energizing said means for transmitting audible signals to the calling station and for energizing said code switches and motor means to rotate the drum and generate audible code signals in a predetermined sequence.

10. A code signaling apparatus to be used in conjunction with a telephone system having a telephone located in the proximity of equipment for monitoring a number of field switches whose position indicates the operating condition of the equipment, said code signaling apparatus comprising
    (a) signal producing means to produce signals over said telephone when said telephone is transmitting, (b) a plurality of switching means which switch circuits by their switching action, (c) a plurality of circuits each containing said signal producing means and at least one of said field switches and switching means so that transmission of signals over the telephone is dependant on the position of said field switches and the switching action of said switching means, (d) coded rotating member means which switches said switching means in coded sequence so signal transmitted over the telephone will be a function of the operating condition of the equipment and the coded sequence, (e) motor means coupled to said rotating means to provide motive power to switch said switching means in coded sequence, (f) a switching circuit activated by the position of the rotating member to alternately supply excitation to either one of two points depending on the position of the rotating member, said switching circuit supplying excitation to the first of said two points while the position of the rotating member changes from its position at the start of rotation to some point intermediate between the start and the stop of rotation, and said switching means supplying excitation to said second of two points for all other positions of the member, (g) a first relay means coupled to the first of said two points which in response to signals received over the telephone couples excitation from said first of said two points to itself and the motor to start the motor rotating.

(h) a second relay means coupled to the second of said two points which, upon excitation of that point by the switching circuit, opens up the telephone for transmission and supplies excitation to the motor to continue the motor's rotation till the switching circuit again supplies excitation to the first of said two points.

References Cited in the file of this patent

UNITED STATES PATENTS

| | | |
|---|---|---|
| 2,042,532 | Johnston | June 2, 1936 |
| 2,154,742 | Gunning | Apr. 18, 1939 |
| 2,338,305 | Simon | Jan. 4, 1944 |
| 2,453,239 | Luhn | Nov. 9, 1948 |